United States Patent
Loschitz et al.

(10) Patent No.: US 8,985,155 B2
(45) Date of Patent: Mar. 24, 2015

(54) PIPE

(75) Inventors: Florian Loschitz, Troisdorf (DE);
Martin Klein, Cologne (DE); Martin Hielscher, Hanau, DE (US)

(73) Assignee: Deutz Aktiengesellschaft, Cologne (DE)

( * ) Notice: Subject to any disclaimer, the term of this patent is extended or adjusted under 35 U.S.C. 154(b) by 30 days.

(21) Appl. No.: 13/820,727

(22) PCT Filed: Aug. 10, 2011

(86) PCT No.: PCT/EP2011/003990
§ 371 (c)(1),
(2), (4) Date: Apr. 3, 2013

(87) PCT Pub. No.: WO2012/028250
PCT Pub. Date: Mar. 8, 2012

(65) Prior Publication Data
US 2013/0180613 A1    Jul. 18, 2013

(30) Foreign Application Priority Data
Sep. 4, 2010  (DE) .......................... 10 2010 044 399

(51) Int. Cl.
| | |
|---|---|
| G05D 7/01 | (2006.01) |
| F16L 55/027 | (2006.01) |
| F01N 3/025 | (2006.01) |
| F01N 3/20 | (2006.01) |
| F16L 55/134 | (2006.01) |
| F23L 3/00 | (2006.01) |
| F23N 5/24 | (2006.01) |

(52) U.S. Cl.
CPC .......... *F16L 55/02754* (2013.01); *F01N 3/025* (2013.01); *F01N 3/2033* (2013.01); *F16L 55/134* (2013.01); *F23L 3/00* (2013.01); *F23N 5/245* (2013.01); *F01N 2240/14* (2013.01); *F23N 2025/20* (2013.01); *F23N 2031/28* (2013.01); *F23N 2035/06* (2013.01); *Y02T 10/26* (2013.01)
USPC ............................................... 138/46; 138/45

(58) Field of Classification Search
USPC ....................................... 138/45, 46; 166/387
See application file for complete search history.

(56) References Cited

U.S. PATENT DOCUMENTS

| | | | |
|---|---|---|---|
| 4,993,452 A | 2/1991 | Hough | |
| 5,216,985 A | 6/1993 | Bruehmmer et al. | |
| 5,772,358 A | 6/1998 | Takahashi | |
| 6,289,864 B1 | 9/2001 | Vide et al. | |
| 6,318,077 B1 | 11/2001 | Claypole et al. | |
| 6,520,284 B2 | 2/2003 | Spannbauer et al. | |
| 7,407,007 B2* | 8/2008 | Tibbles ........................ | 166/278 |
| 7,762,341 B2* | 7/2010 | Hammer ...................... | 166/370 |
| 7,828,067 B2* | 11/2010 | Scott et al. .................... | 166/386 |

(Continued)

FOREIGN PATENT DOCUMENTS

| | | |
|---|---|---|
| DE | 29700941 | 5/1998 |
| DE | 10004261 | 8/2000 |

(Continued)

*Primary Examiner* — Patrick F Brinson
(74) *Attorney, Agent, or Firm* — Davidson, Davidson & Kappel, LLC

(57) ABSTRACT

A pipe, in particular in the air supply system of internal combustion engines which are provided, in particular, with an intake system and/or control electronics, is described, wherein the internal pipe and/or the internal pipe surface (1) have/has at least one element (1, 5, 6) which changes the diameter (2) of the internal pipe and/or the cross-sectional area of the internal pipe.

14 Claims, 4 Drawing Sheets

(56) References Cited

U.S. PATENT DOCUMENTS

| | | | |
|---|---|---|---|
| 7,938,191 B2 * | 5/2011 | Vaidya | 166/387 |
| 8,453,746 B2 * | 6/2013 | Hailey et al. | 166/332.8 |
| 8,540,032 B2 * | 9/2013 | Nutley et al. | 166/387 |
| 2005/0199401 A1 * | 9/2005 | Patel et al. | 166/387 |
| 2006/0272806 A1 * | 12/2006 | Wilkie et al. | 166/192 |
| 2007/0044962 A1 * | 3/2007 | Tibbles | 166/278 |
| 2008/0149351 A1 * | 6/2008 | Marya et al. | 166/387 |
| 2010/0314134 A1 * | 12/2010 | Nutley et al. | 166/387 |

FOREIGN PATENT DOCUMENTS

| | | |
|---|---|---|
| DE | 19903165 | 8/2000 |
| DE | 10111787 A1 | 9/2001 |
| EP | 0724110 | 7/1996 |
| JP | 2011092406 | 5/2011 |
| WO | WO 2008155564 A1 | 12/2008 |
| WO | WO 2009081228 A1 | 7/2009 |

* cited by examiner

PIPE

BACKGROUND

Such pipes are known, for example, from burner systems used for the regeneration of diesel particulate filters (DPF). Check valves are employed in these pipes in order to prevent return flows.

A drawback here is that such check valves lead to significant pressure loss during regular operation.

SUMMARY OF THE INVENTION

It is an object of the present invention to provide a pipe that effectively prevents return flows at acceptable pressure loss levels.

The present invention provides a pipe particularly in the air-supply system, especially of internal combustion engines provided with an intake system and/or an electronic control unit, whereby the inner pipe and/or the inner surface of the pipe has at least one element that changes the inner diameter of the pipe. In this context, it is advantageous that the change of the inner diameter of the pipe, especially its reduction, can prevent a return flow.

Another refinement according to the invention provides that the inner surface of the pipe has at least one swelling element whose volume can change and this entails the advantage that such a volume change can prevent unwanted return flows.

In another refinement according to the invention, it is provided that the pipe has at least one temperature sensor. Such a temperature sensor has the advantage that regular temperature monitoring makes it possible to reliably detect the occurrence of hot return flows.

One refinement according to the invention provides that the pipe has at least two elements that can move with respect to each other. The advantage of these at least two parts that can move with respect to each other is that they can reliably close the pipe cross section, so that unwanted return flows can be prevented.

Another refinement according to the invention provides that the swelling element whose volume can change especially has foaming elements. The advantage of foaming elements is that they can quickly and reliably protect the pipe cross section against hot return flows. In an alternative embodiment, the expandable elements contain water that is released in order to cool and protect the pipe in case of such a foaming process.

In another refinement according to the invention, it is provided that the swelling element (3) whose volume can change and/or the temperature sensor (10) communicates with the intake system and/or with the electronic control unit (12) of the internal combustion engine. Here, it is advantageous that, owing to the communication between the sensor and the vehicle electronic unit, for example, in the onboard computer system or in the fault memory unit of the vehicle or of the corresponding device with the internal combustion engine, a fault message can be entered, for example, showing that a certain temperature has been exceeded, which then provides an indication that a return flow has occurred so that a maintenance recommendation can be generated.

It is provided according to the invention that the pipe has a connection piece and that the volume of the swelling element changes by means of gas and/or liquid that flows in or out via the connection piece. The advantage lies in the possibility of using media stemming from the engine environment in order to change the cross section.

Another refinement according to the invention provides that the volume of the swelling element(s) changes as a function of the temperature. Advantageously, this allows the device to be protected against overheating and damage.

It is likewise provided according to the invention that the element in the pipe has an air-permeable and/or liquid-permeable and/or temperature-resistant and/or foaming layer. Such a layer can advantageously consist of an intumescent material. Such materials are also referred to as intumescent foams. During the foaming process, these materials form an insulating layer as a heat barrier, and upon exposure to heat, release gases, so that a foamed ash layer is formed which completely seals the cross section, for instance, thus preventing the propagation of harmful return flows. Water, which has a cooling effect, is released during the intumescence process. A layer can be, for instance, 1 mm thick, which then expands to about 50 mm once it intumesces.

According to the invention, a method is provided for the protection of pipes against harmful return flows, a process in which a device according to claims 1 to 11 is used.

These and other features of preferred refinements of the invention ensue from the claims as well as from the description and the drawings, whereby the individual features can be implemented on their own or else in the form of sub-combinations of the embodiment of the invention as well as in other fields, and can also constitute patentable embodiments for which protection is hereby being claimed. Embodiments of the invention are presented in the drawings and will be elaborated upon below.

DETAILED DESCRIPTION

Figure 1:
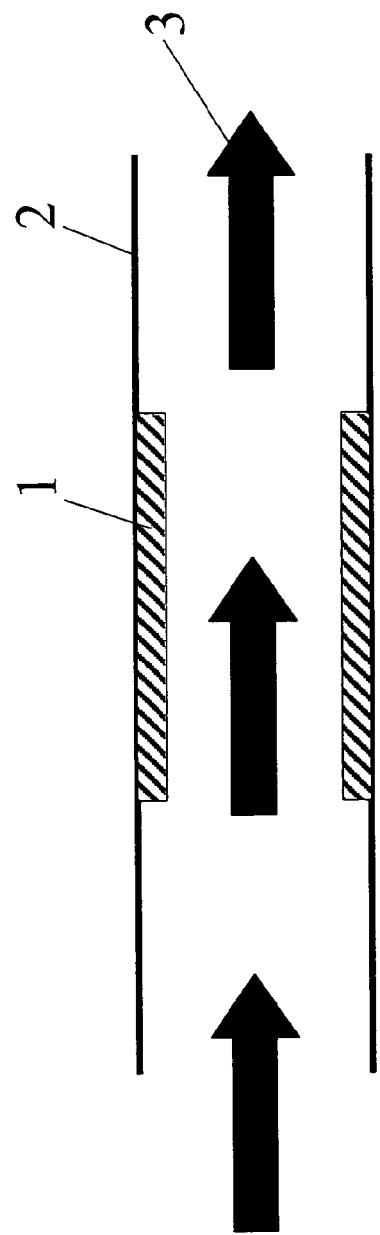
FIG. 1: the installation principle prior to the activation. The arrows show the regular direction of flow ("cold gas")

FIG. 1 depicts the installation principle of the swelling element 1 in the inner pipe 2 prior to the activation. The arrows show the regular direction of flow of the cold gas 3.

Figure 2:
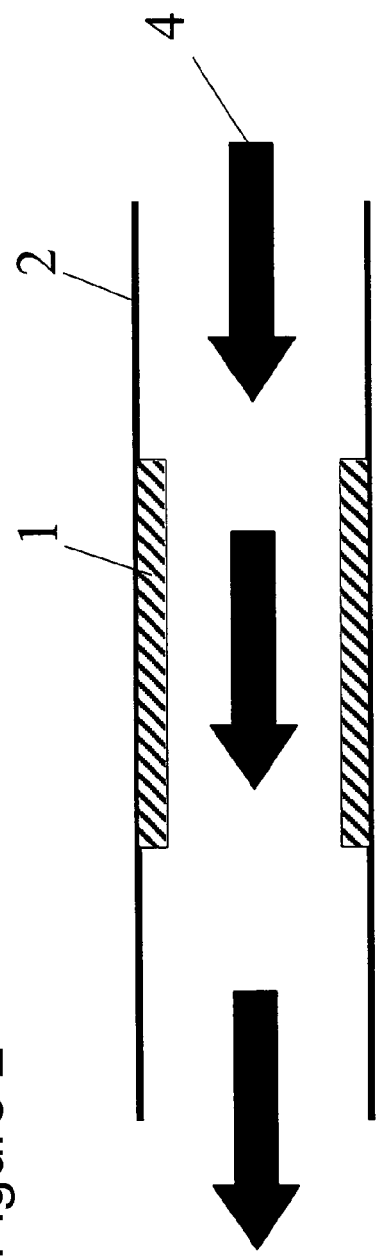
FIG. 2: the activation situation ("hot gas" in the opposite direction)

FIG. 2 shows the activation situation of the swelling element 1 when hot gas 4 is flowing in the opposite direction through the pipe 2.

Figure 3:
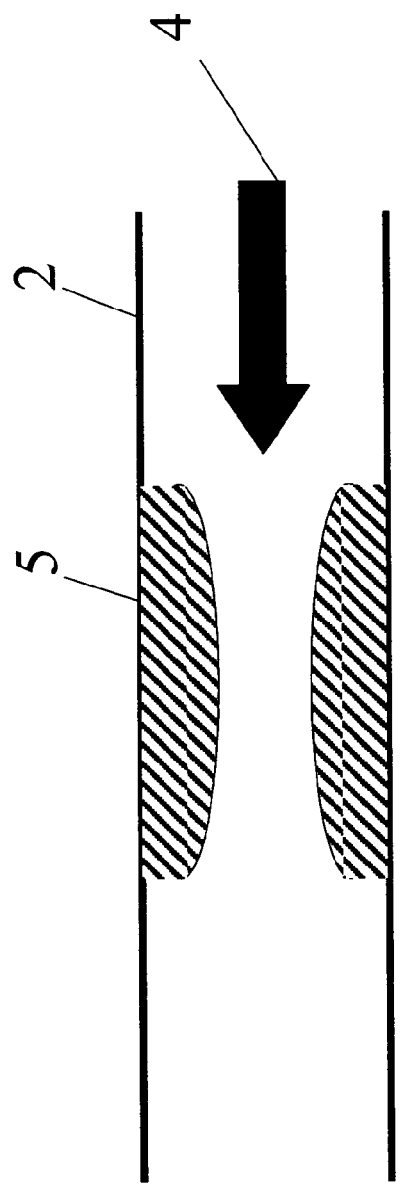
FIG. 3: the activation of the swelling element

FIG. 3 discloses the activation of the swelling element(s) 5 by the hot-gas flow 4. A return flow of hot gas is meant to be effectively prevented by closing the inner pipe 2 by means of the swelling elements 1, 5.

Figure 4:
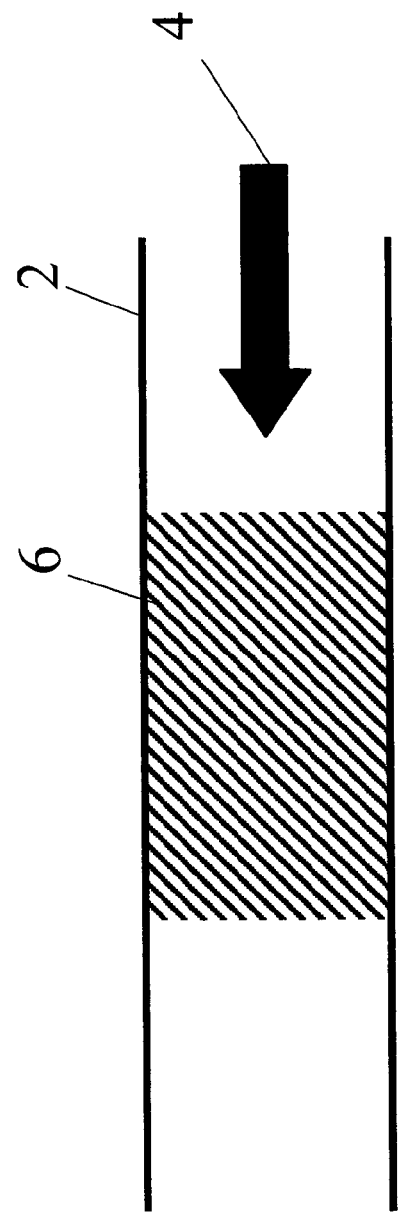
FIG. 4: the final situation, the closed line

FIG. 4 depicts the final situation of the line 2 closed by means of the swelling element 6, so that a return flow of hot gas 4 through the inner pipe 2 is prevented. The swelling element 6 has reached its final shape via the stages of the swelling element 1 of FIG. 1 and of the swelling element 5 of FIG. 3.

Figure 5:
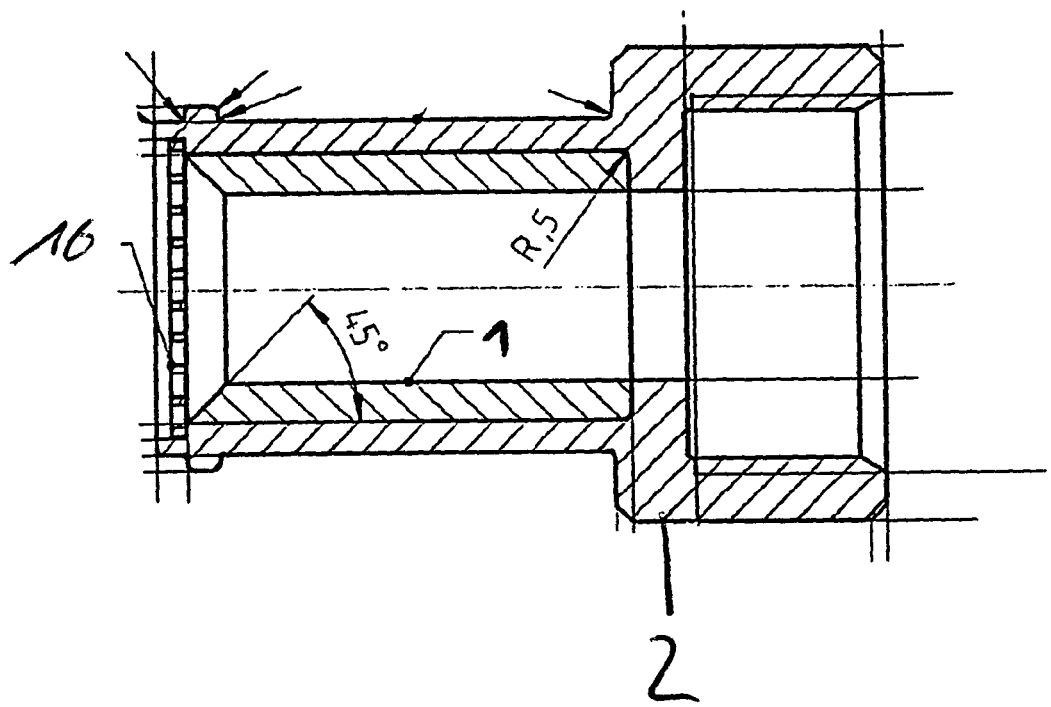
FIG. 5: a sectional view through a pipe

FIG. 5 shows the tubular insert 1 consisting, for instance, of foaming swelling material in the inner pipe 2. The effect of high temperatures on the swelling elements 1, 5, 6 in the inner pipe 2 over the course of time is shown in FIGS. 1 to 4. Following the foaming process, in order to avoid damage to the compressor 9, which can be seen in FIG. 6, the inner pipe 2 remains closed until the next visit to the repair shop. Moreover, a perforated plate 16 is arranged at the end of the inner pipe 2 and it is meant to prevent foam particles from getting into the pipeline between the burner 7 and the compressor 9. The arrangement of the pipe 2 in the air-supply system of a burner system used for exhaust-gas treatment is shown in FIG. 6.

Figure 6:
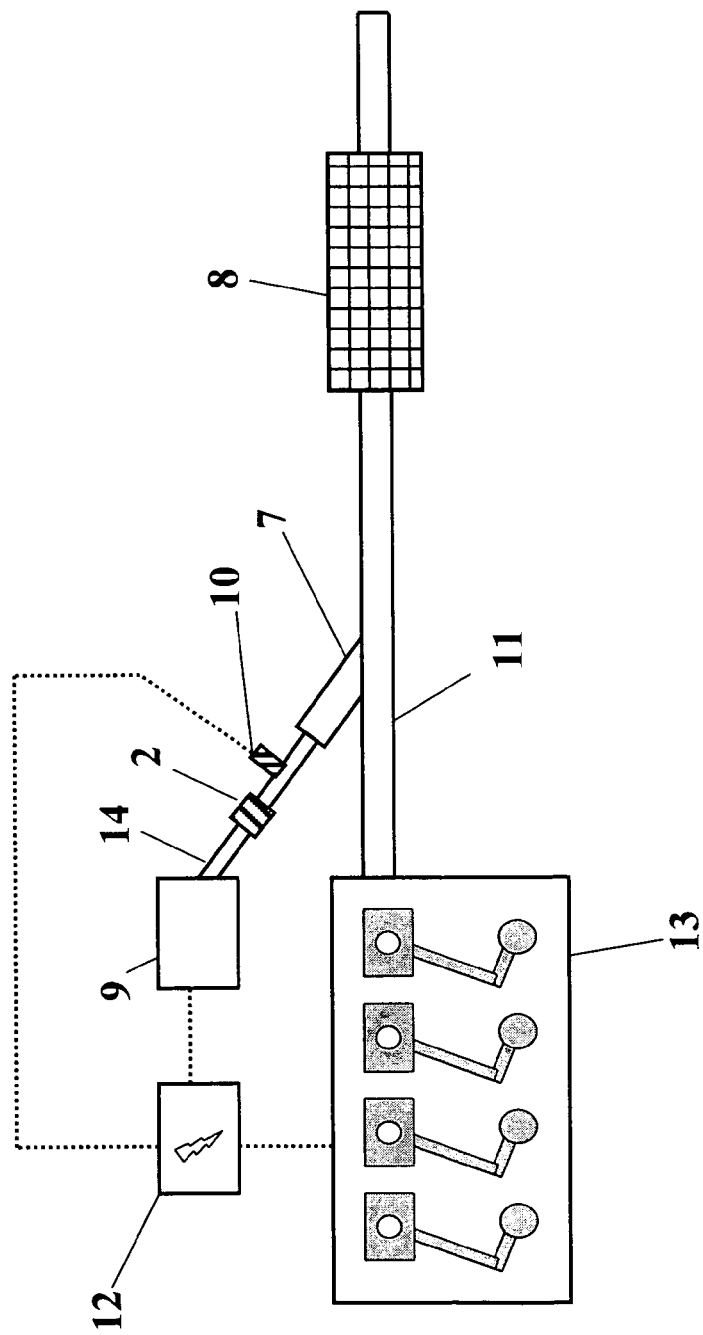
FIG. 6: a schematic depiction of an installed pipe.

FIG. 6 discloses an inner pipe 2 as part of a pipe 14 that serves as the main air line of a burner system used for the regeneration of a DPF 8, with a swelling element 1, 5, 6 (not shown here), as depicted, for example, in FIGS. 1 to 5, in a system situated between the internal combustion engine 13 and the diesel particulate filter 8 (DPF).

The pipe 14 is arranged between the burner 7 and the compressor 9, and it has a temperature sensor 10 directly in front of the burner 7. The burner 7 opens into the exhaust-gas segment 11, which is arranged between the internal combustion engine 13 and the diesel particulate filter 8. The electronic control unit 12 communicates with the temperature sensor 10 and the connection piece 15. In an alternative embodiment, it is provided that the swelling elements shown in FIGS. 1 to 5 can be filled with gaseous or liquid media through the connection piece 15 in response to a control signal induced on the basis of the temperature sensor 10 via the electronic control unit 12.

REFERENCE NUMERALS 1 swelling element
2 inner pipe
3 cold gas flow
4 hot gas flow
5 foaming/volume-changing material during the activation
6 foaming/volume-changing material in the final state
7 burner
8 DPF
9 compressor
10 temperature sensor
11 exhaust-gas segment
12 electronic control unit
13 internal combustion engine
14 pipe as the main air line of a burner system for the regeneration of a DPF
15 connection piece

What is claimed is:

1. A pipe for an air-supply system of a burner system comprising:
    at least one of an inner pipe and an inner surface, the at least one of the inner pipe and the inner surface including at least one swelling element for changing an innermost diameter or an inner innermost cross-sectional surface of the pipe, the at least one swelling element having a volume that changes as a function of temperature and is being expandable radially inward to change the innermost diameter or the inner innermost cross-sectional surface of the pipe.

2. The pipe as recited in claim 1 wherein the at least one swelling element is on the inner surface of the inner pipe.

3. The pipe as recited in claim 2 wherein the at least one swelling element has foaming elements.

4. The pipe as recited in claim 2 wherein the at least one swelling element communicates with least one of an intake system and an electronic control unit of an internal combustion engine.

5. The pipe as recited in claim 1 further comprising at least one temperature sensor.

6. The pipe as recited in claim 5 wherein the at least one temperature sensor communicates with at least one of an intake system and with an electronic control unit of an internal combustion engine.

7. The pipe as recited in claim 1 wherein the at least one swelling element includes at least two elements that are movable with respect to each other.

8. The pipe as recited in claim 1 wherein the pipe is configured as a diffuser.

9. The pipe as recited in claim 1 the at least one swelling element includes a layer that is at least one of air-permeable, liquid-permeable, temperature-resistant and foaming.

10. A method to protect an air supply system of a burner system from harmful return flows, comprising placing the pipe of claim 1 in the air supply system.

11. An air supply system of an internal combustion engine comprising:
    the pipe recited in claim 1.

12. The pipe as recited in claim 1 wherein the at least one element is configured to be expandable radially inward to close and seal the pipe and prevent a return flow.

13. A pipe for an air-supply system of a burner system comprising:
    at least one of an inner pipe and an inner surface, the at one of the inner pipe and the inner surface including at least one element for changing an innermost diameter or an inner innermost cross-sectional surface of the pipe, the at least one element being configured to be expandable in response to a temperature increase to close and seal the pipe and prevent a return flow.

14. An air supply system of an internal combustion engine comprising:
    the pipe recited in claim 13.

* * * * *